United States Patent [19]
Baker

[11] Patent Number: 5,199,261
[45] Date of Patent: Apr. 6, 1993

[54] INTERNAL COMBUSTION ENGINE WITH TURBOCHARGER SYSTEM

[75] Inventor: Glenn L. Baker, Columbus, Ind.

[73] Assignee: Cummins Engine Company, Inc., Columbus, Ind.

[21] Appl. No.: 925,320

[22] Filed: Aug. 4, 1992

Related U.S. Application Data

[63] Continuation of Ser. No. 566,087, Aug. 10, 1990, abandoned.

[51] Int. Cl.$^5$ ............................................. F02B 37/12
[52] U.S. Cl. ........................................ 60/612; 60/602
[58] Field of Search ............................. 60/601–603, 60/612

[56] References Cited

U.S. PATENT DOCUMENTS

| | | |
|---|---|---|
| 2,380,777 | 7/1945 | Moss . |
| 2,773,348 | 12/1956 | Grieshaber et al. . |
| 3,576,102 | 4/1971 | West .................... 60/612 X |
| 4,228,655 | 10/1980 | Herschmann et al. . |
| 4,299,090 | 11/1981 | Deutschmann . |
| 4,388,802 | 6/1983 | Dinger et al. . |
| 4,418,536 | 12/1983 | Deutschmann . |
| 4,457,134 | 7/1984 | Deutschmann . |
| 4,638,634 | 1/1987 | McLean . |
| 4,930,315 | 6/1990 | Kanesaka ............ 60/612 X |

FOREIGN PATENT DOCUMENTS

| | | | |
|---|---|---|---|
| 3933518 | 4/1990 | Fed. Rep. of Germany | 60/612 |
| 142226 | 6/1980 | German Democratic Rep. | 60/612 |
| 190518 | 11/1983 | Japan | 60/612 |
| 82526 | 5/1984 | Japan | 60/612 |
| 40728 | 3/1985 | Japan | 60/612 |
| 625 | 1/1987 | Japan | 60/612 |
| 16130 | 1/1988 | Japan | 60/612 |

OTHER PUBLICATIONS

"Graphic Symbols for Fluid Power Diagrams", published by ASME, New York, N.Y., 1967, p. 12.
SAE Technical Paper Series 860074, "A Sequential Turbocharging Method for Highly-Rated Truck Diesel Engines", Yurij G. Borilla, 1986.

*Primary Examiner*—Michael Koczo
*Attorney, Agent, or Firm*—Woodard, Emhardt, Naughton, Moriarty & McNett

[57] ABSTRACT

The present invention relates to an internal combustion engine and more particularly to an internal combustion engine which includes a turbocharger system having at least one smaller exhaust gas turbocharger and at least one larger exhaust gas turbocharger, as well as means for controlling the exhaust gas and intake air flow to the respective turbochargers. The turbochargers and control means are interconnected to provide pressurized intake air throughout the entire operating range of the internal combustion engine, while effectively bypassing the smaller exhaust gas turbocharger during operating conditions which produce high exhaust gas volumes. The operating characteristics of this turbocharger system are matched with the operating range of an internal combustion engine to provide improved performance, efficiency, transient response and reliability, while reducing maintenance and undesirable emissions.

3 Claims, 1 Drawing Sheet

INTERNAL COMBUSTION ENGINE WITH TURBOCHARGER SYSTEM

This application is a continuation of application Ser. No. 566,087, filed Aug. 10, 1990, now abandoned.

FIELD OF INVENTION

The present invention relates to an internal combustion engine, and more particularly to an internal combustion engine which includes a turbocharger system having at least two exhaust gas turbochargers of different size. The turbocharger system comprises: at least one exhaust gas turbocharger adapted to supply the internal combustion engine with pressurized intake air when the internal combustion engine produces low exhaust gas mass flow; at least one relatively larger exhaust gas turbocharger adapted to supply the internal combustion engine with pressurized intake air when the internal combustion engine produces higher exhaust gas mass flow sufficient to effectively turn the turbine of the larger turbocharger; and an interconnection between the turbochargers to prevent the smaller turbocharger from exceeding its operational limit when the internal combustion engine produces higher exhaust gas mass flow.

BACKGROUND OF THE INVENTION

Turbocharger systems are used with internal combustion engines to supply pressurized intake air to the cylinders for improving combustion which decreases undesirable emissions and increases performance and efficiency. Internal combustion engines have a wide range of operating speeds and loads which produce widely differing volumes of exhaust gases. A single turbocharger is not capable of efficiently operating with widely differing volumes of exhaust gases. Therefore, known turbocharging systems using a single turbocharger limit their operating range, for example, by not functioning at low engine speeds.

In order to resolve the problems resulting from the difference in operating range between the engine and turbocharger, multiple turbocharger systems have been developed. Known multiple turbocharger applications have difficulties in controlling which of the system's turbochargers are to be used under various ranges of operating conditions and how the flow of intake air and exhaust gases are to be controlled in transient modes of operation. For example, if two similar sized turbochargers are used in series, then each turbocharger has an operating range which does not correspond to the entire operating range of the engine. Thus, the turbocharging system will either fail to provide optimal pressurized intake air during low exhaust gas mass flow conditions or lack capacity during high exhaust gas mass flow conditions. If two similar sized turbochargers are used in parallel, transitional performance is detrimentally effected by a loss in compression of the intake air when exhaust gases are diverted from the first turbocharger to the second turbocharger.

Other turbocharging systems have used two turbochargers of different size. These systems require complex controls which involve the use of electronically or mechanically operated air flow management valves in the intake air and exhaust gas systems, and additional means for avoiding the problems of surging and exceeding the operational limits of the individual turbochargers. Moreover, these complex controls increase the overall system costs, maintenance, weight, and structural volume, as well as reduce the durability of the system.

SUMMARY OF THE INVENTION

The present invention overcomes the disadvantages of the prior art single and multiple exhaust gas turbocharger systems by interconnecting at least one smaller exhaust gas turbocharger to supply pressurized intake air during low exhaust gas mass flow conditions, and at least one larger exhaust gas turbocharger to supply pressurized intake air during high exhaust gas mass flow conditions. The smaller turbocharger and the larger turbocharger are interconnected by control means to assure that the smaller turbocharger is predominantly operative with low exhaust gas flow conditions and that the larger turbocharger is predominantly operative with high exhaust gas flow conditions.

The participation between the smaller turbocharger and the larger turbocharger in the preferred embodiment is gradually changing as the precalibrated exhaust gas flow control means responds to changes in exhaust gas flow. In an alternative embodiment, the participation between the turbochargers changes as the exhaust gas flow control means responds to changes in exhaust gas flow, but the exhaust gas flow control means has at least one open position and remains in at least an intermediate open position for low exhaust gas flow conditions. In a further alternative embodiment, the participation between the two turbochargers is substantially an on/off relationship triggered by a predetermined volume of exhaust gas flow. In still another alternative embodiment, the participation between the two turbochargers is dependent upon a sensing means commonly used in engine control systems and an actuator means commonly used to operate an air flow control means, which together respond to at least one engine parameter, such as intake air pressure in the engine's intake manifold, throttle position or engine speed, to vary the opening of the exhaust gas flow control means. The actuator means and the control means could be contained within a single means which operatively responds to the sensing means to control the exhaust gas flow. In all of the embodiments, the goal is to operate the turbochargers to optimally tune the turbocharging system over the entire operating range of the engine.

In the preferred embodiment, the compressor side of the smaller turbocharger is connected to the intake gas port of the engine and in parallel with an intake air flow control means. The parallelly connected compressor of the smaller turbocharger and the intake air flow control means are connected in series with the compressor of the larger turbocharger. The turbine side of the smaller turbocharger is connected to the exhaust port of the engine and in parallel with an exhaust gas flow control means. The parallelly connected turbine of the smaller turbocharger and the exhaust gas flow control means are connected in series with the turbine of the larger turbocharger.

In the preferred embodiment, the exhaust gas control means directs exhaust gas to the smaller turbocharger when the internal combustion engine produces low exhaust gas mass flow. Low exhaust gas mass flow is defined as the volume of gas flow which is insufficient to effectively turn the turbine of the larger turbocharger. After propelling the turbine of the small turbocharger, the exhaust gases are directed to the turbine of the larger turbocharger to aid the initial propulsion of the larger turbocharger turbine. As the engine speed or load increases, the exhaust gas mass flow increases. During periods of high exhaust gas mass flow, the exhaust gas flow control means which had been directing exhaust gases to the smaller turbocharger is opened. High exhaust gas flow is defined as the volume of gas flow which is sufficient to effectively turn the turbine of the larger turbocharger. As the exhaust gas flow control means begins to open, the exhaust gas is partially directed to the larger turbocharger and partially directed to the smaller turbocharger which eventually discharges exhaust gases to the larger turbocharger. Directing the exhaust gases to the turbochargers sequentially under lower exhaust gas mass flow conditions and providing partial exhaust gas flow to the larger turbocharger during transient operation reduces the lag in accelerating the turbine of the larger turbocharger. When the exhaust gas flow control means is fully open, exhaust gases bypass the smaller turbocharger and are directed only to the larger turbocharger. The smaller turbocharger is bypassed during high exhaust gas mass flow conditions to prevent it from exceeding its operational limits.

The intake air flow control means directs intake air coming from the larger turbocharger compressor to the smaller turbocharger compressor when the engine is producing low exhaust gas mass flows. As the larger turbocharger turbine receives an increase in exhaust gas mass flow, the corresponding larger turbocharger compressor increases the intake air pressure between the larger turbocharger compressor and the intake air flow control means. In the preferred embodiment, the intake air flow control means is opened by the higher intake air pressure and the pressurized intake air is directed directly to the engine, thus, bypassing the smaller turbocharger compressor. In an alternative embodiment, the control of the intake air flow is dependent upon a sensing means commonly used in engine control systems and an actuator means commonly used to operate an air flow control means, which together respond to at least one engine parameter, such as intake air pressure in the engine's intake manifold, throttle position or engine speed, to vary the opening of the intake air flow control means. The actuator means and the control means could be contained within a single means which operatively responds to the sensing means to control the intake air flow.

The present invention provides advantages over the prior art by reducing undesirable emissions, and increasing performance and efficiency during operating conditions which produce low to moderate exhaust gas mass flows.

The present invention also provides an internal combustion engine equipped with at least two exhaust gas turbochargers of different size which overcome the disadvantages present in the prior art. The intention of the present invention is to enable increased engine performance in the areas of power output or fuel efficiency, facilitate a reduction in undesirable emissions, provide improved responsiveness during transient engine operating conditions, and to perform reliably while requiring less maintenance.

BRIEF DESCRIPTION OF THE DRAWINGS

For a complete understanding of the invention, references should now be made to the embodiments illustrated in greater detail in the accompanying drawings and described below by way of example.

In the drawings.

It should be understood that the drawings are in block format and that certain details of the actual structure which are not necessary for the understanding of the present invention may have been omitted. It should also be understood that the invention is not necessarily limited to the particular embodiments illustrated herein.

DETAILED DESCRIPTION OF THE PREFERRED EMBODIMENT

Figure 1:
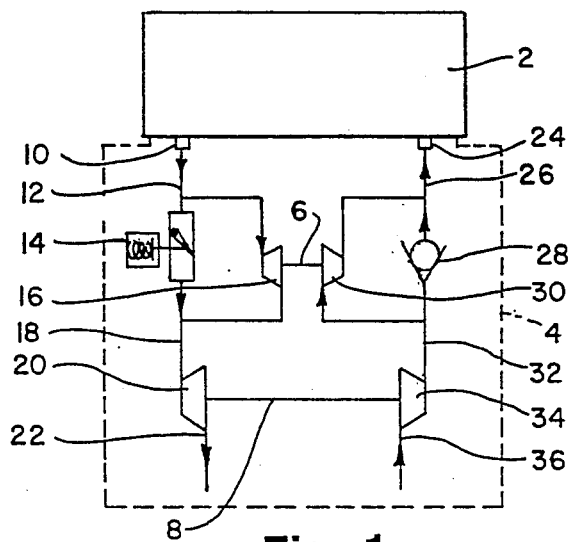
FIG. 1 is a block diagram of an internal combustion engine constructed in accordance with the present invention including two exhaust gas turbochargers of different size.

Referring to FIG. 1, there is an internal combustion engine 2 and a turbocharging system 4. The turbocharging system 4 has a first exhaust gas turbocharger 6 and a second exhaust gas turbocharger 8. The second turbocharger 8 is larger than the first turbocharger 6. A common exhaust pressure line 12 is connected to the exhaust gas port 10 of the engine 2. The common exhaust pressure line 12 is connected to an exhaust gas flow control means 14 and the turbine 16 of the smaller turbocharger 6. The exhaust gas flow control means 14 can be any means of controlling airflow, shown in the preferred embodiment as a valve which functions the same as a check valve. In other words, exhaust gas flow control means 14 is preferably a valve that permits flow in one direction only, and which is biased closed but is openable when sufficient pressure overcomes the bias. The exhaust gas flow control means 14 is connected in parallel with the turbine 16 of the smaller turbocharger 6. The output from the turbine 16 of the smaller turbocharger 6 is connected via line is to the turbine 20 of the larger turbocharger 8. In addition, the turbine 20 of the larger turbocharger 8 is connected via line 18 to the output of the exhaust gas flow control means 14. The output from the turbine 20 of the larger turbocharger 8 discharges the exhaust gases through the discharge line 22.

Similarly, a common intake pressure line 26 is connected to the intake port 24 of the engine 2. The common intake pressure line 24 is connected to an intake air flow control means 28 and the compressor 30 of the smaller turbocharger 6. The intake air flow control means 28 can be any means of controlling airflow, shown in the preferred embodiment as a valve which functions the same as a check valve. In other words, intake air flow control means 28 permits flow in one direction only, is biased closed, but is openable in response to a pressure which is sufficient to overcome the bias. The intake air flow control means 28 is connected in parallel with the compressor 30 of the smaller turbocharger 6. The inlet of the compressor 30 of the smaller turbocharger 6 is connected via line 32 to the outlet of the compressor 34 of the larger turbocharger 8. In addition, the compressor 34 of the larger turbocharger 8 is connected via line 32 to the inlet of the intake air flow control means 28. The inlet to the compressor 34 of the larger turbocharger 8 draws fresh air through the intake air line 36.

During low exhaust gas mass flow operating conditions, the exhaust gas flow control means 14 and the intake air flow control means 28 are closed. Thus, the exhaust gases drive the turbine 16 of the smaller turbocharger 6 so as to provide pressurized intake air to the engine 2 through the common intake pressure line 26 and the intake port 24. The exhaust gases discharge through the larger turbocharger 8 to aid in the initial propulsion of the turbine 20 of the larger turbocharger 8 prior to discharging through the exhaust discharge line 22. In turn, fresh air is drawn in through the intake air line 36 and through the larger turbocharger 8 and is pressurized by the compressor 30 of the smaller turbocharger 6 prior to entering the engine 2. In an alternative embodiment, the exhaust gas flow control means 14 could be made to have at least one open position and to be in an intermediate open position during low exhaust gas flow to always direct at least a portion of the exhaust gas flow to the turbine 20 of the larger turbocharger 8 to further aid in the initial propulsion of the turbine 20 of the larger turbocharger 8.

As operating conditions of the engine 2 increase the exhaust gas mass flow, the exhaust gas flow control means 14, shown as a check valve in the preferred embodiment, partially opens to partially direct exhaust gases to the turbine 16 of the smaller turbocharger 6 and to partially direct exhaust gases to the turbine 20 of the larger turbocharger s to improve transitional performance. In an alternative embodiment, the exhaust gas flow control means 14 could be made to operate in an on/off manner, either directing all exhaust gas flow to the turbine 16 of the smaller turbocharger 6 or to the turbine 20 of the larger turbocharger 8.

In the preferred embodiment, as the exhaust gas mass flow further increases, the exhaust gas flow control means 14 opens further to the point of full opening under exhaust gas mass flow conditions which exceed the operational limits of the smaller turbocharger 6. The opening of the exhaust gas flow control means 14 and the increased exhaust gas mass flow accelerate the turbine 20 of the larger turbocharger 8 which, in turn, increases the intake air pressure in the common intake connecting line 32. With the intake air flow control means 28 being a check valve, as shown in the preferred embodiment, the increase in intake air pressure triggers the opening of the intake air flow control means 28 at a chosen preset pressure value which is dependent on the particular turbochargers and engine applications. Thus, during high exhaust gas mass flow operating conditions, the smaller turbocharger 6 is bypassed, preventing surge and the possibility of exceeding its operational limits.

Figures 2, 3:
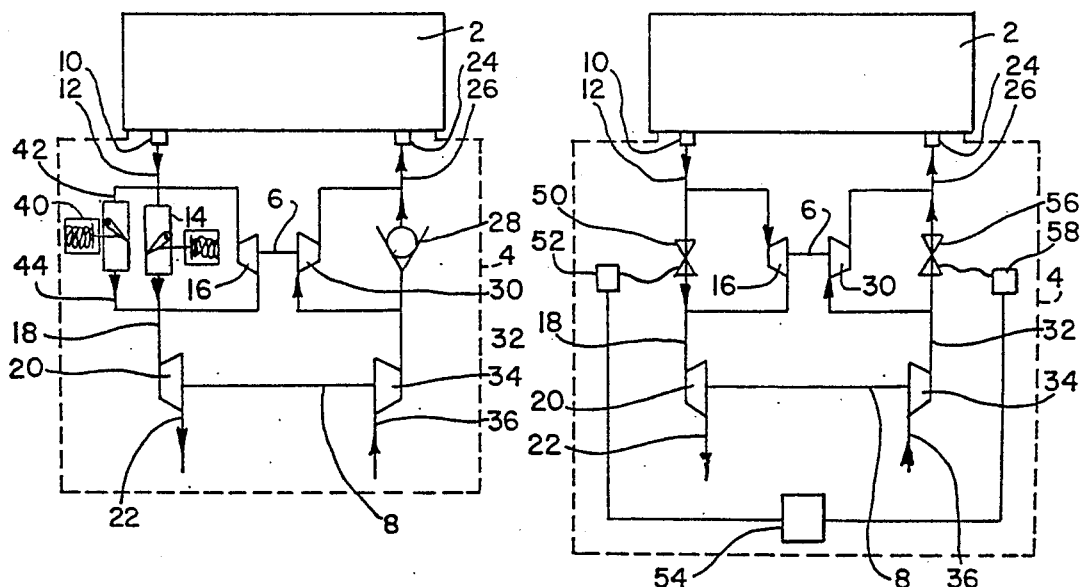
FIG. 2 is a block diagram of a modification of the internal combustion engine providing additional protection for the turbocharging system.
FIG. 3 is a block diagram of a further modification of the turbocharging system including an alternative means of controlling exhaust gas flow and an alternative means of controlling intake air flow.

FIG. 2 shows an arrangement which includes a second exhaust gas flow control means 40 connected in parallel with the exhaust gas flow control means 14 and the turbine 16 of the smaller turbocharger 6 by means of the additional exhaust connecting lines 42 and 44. The second exhaust gas flow control means 40 is shown in the preferred embodiment as a valve which functions the same as a check valve which can be preset to open at a given mass flow. The second exhaust gas flow control means 40 is a safety feature which opens under high exhaust gas mass flow conditions if the first exhaust gas flow control means 14 fails to open properly. This modification prevents the smaller turbocharger 6 from exceeding its operational limit even if the exhaust gas flow control means 14 does not operate properly.

FIG. 3 shows an arrangement which provides an alternative means for controlling the exhaust gas flow and the intake air flow which includes an exhaust gas flow control means 50 connected to an actuator means 52 commonly used to operate air flow control means, which receives input regarding engine parameters from a sensing means 54 commonly used in engine control systems, and an intake air flow control means 56 connected to an actuator means 58 commonly used to operate air flow control means, which receives input regarding engine parameters from the sensing means 54. In an alternative embodiment, the exhaust gas flow control means 50 and the actuator means 52 could be contained within a single means. Similarly the intake air flow control means 56 and the actuator means 58 could be contained within a single means. In another alternative embodiment, the actuator means 52 or the actuator means 58 could independently receive input from the sensing means 54, or each respective actuator means could receive input from two respective sensing means such as that embodied in sensing means 54. These various alternative means for controlling exhaust gas flow and intake air flow provide a means of optimally tuning the turbocharger system 4 throughout the entire operating range of the engine 2.

From the description thus far provided, a turbocharging system that overcomes the aforementioned problems with the prior art by providing a simple and efficient means of pressurizing intake air over the broad engine operating range of an internal combustion engine has been described. It will be apparent that the proposed turbocharging system may be used in a number of internal combustion engine applications and that a number of modifications can be made in the invention disclosed, particularly by those having the benefit of the foregoing teachings, without departing from the spirit of these principles. However, these features preferably are utilized together in the advantageous assembly described herein. Accordingly, while the invention disclosed herein has been described with reference to the presently contemplated best mode for practicing the invention, it is intended that this invention be limited only by the scope of the appended claims.

What is claimed is:

1. A turbocharger system for an internal combustion engine having an exhaust port and an intake port comprising:

a first turbocharger having an operational limit and a first turbine connected to the exhaust port of the engine via a first exhaust line and a first compressor connected to the intake port of the engine via a first intake line;

a second turbocharger relatively larger than said first turbocharger and having a second turbine connected to said first turbine via a second exhaust line and a second compressor connected to said first compressor via a second intake line;

a first exhaust flow control means between said first exhaust line and said second exhaust line in parallel with said first turbine for bypassing at least a portion of the exhaust from the engine past said first turbine to said second turbine, said first exhaust flow control means being biased to be at least partially closed but being openable solely in response to an exhaust pressure increase from the exhaust port sufficient to overcome said bias such that sufficient exhaust is diverted to said second turbine that said first turbine is prevented from exceeding said operational limit when the operating conditions of the engine increase; and an intake air control means between said first compressor line and said second compressor line in parallel with said first compressor for bypassing at least a portion of the air from said second compressor past said first compressor to the engine, said intake air control means being biased closed but being openable in response to an intake air pressure increase from said second compressor above a predetermined pressure.

2. The turbocharger system of claim 1 wherein said first exhaust flow control means is biased to be substantially closed.

3. A turbocharger system for an internal combustion engine having an exhaust port and an intake port comprising:

a first turbocharger having an operational limit and a first turbine connected to the exhaust port of the engine via a first exhaust line and a first compressor connected to the intake port of the engine via a first intake line;

a second turbocharger relatively larger than said first turbocharger and having a second turbine connected to said first turbine via a second exhaust line and a second compressor connected to said first compressor via a second intake line;

a first exhaust flow control means between said first exhaust line and said second exhaust line in parallel with said first turbine for bypassing at least a portion of the exhaust from the engine past said first turbine to said second turbine, said first exhaust flow control means being biased to be at least partially closed but being openable in response to an exhaust pressure increase from the exhaust port such that sufficient exhaust is diverted to said second turbine that said first turbine is prevented from exceeding said operational limit when the operating conditions of the engine increase;

an intake air control means between said first compressor line and said second compressor line in parallel with said first compressor for bypassing at least a portion of the air from said second compressor past said first compressor to the engine, said intake air control means being biased closed but being openable in response to an intake air pressure increase from said second compressor above a predetermined pressure.

said first exhaust flow control means is substantially fully open at a predetermined exhaust pressure; and the turbocharger system further comprises a second exhaust flow control means between said first exhaust line and said second exhaust line in parallel with said first exhaust control means and said first turbine, said second exhaust flow control means being biased closed but being openable in response to an exhaust pressure increase above said predetermined exhaust pressure.

* * * * *